Sept. 25, 1951     B. A. ZENK     2,569,086
ADJUSTABLE TRAILER HITCH
Filed May 20, 1949     2 Sheets-Sheet 1
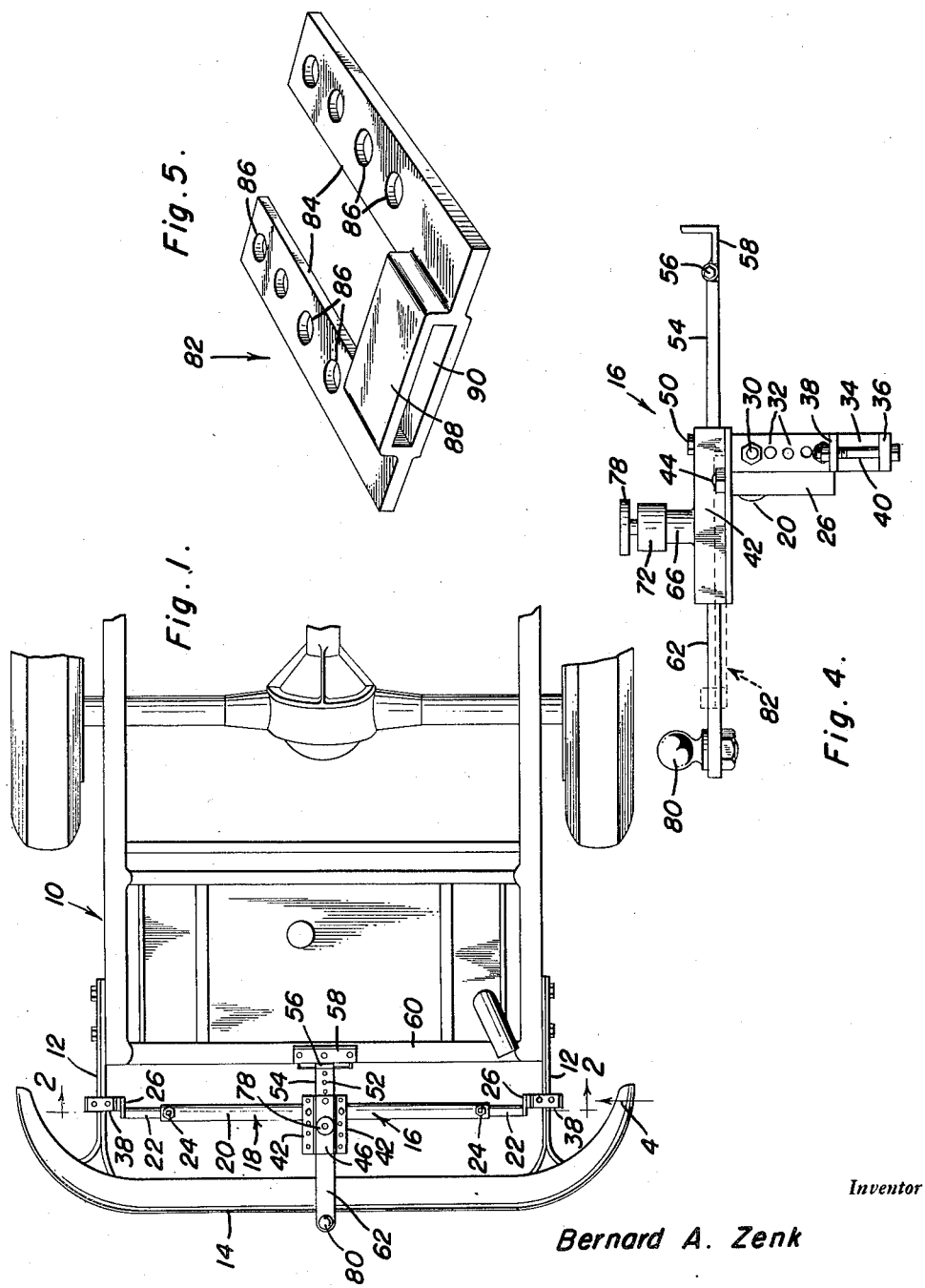
Inventor
Bernard A. Zenk

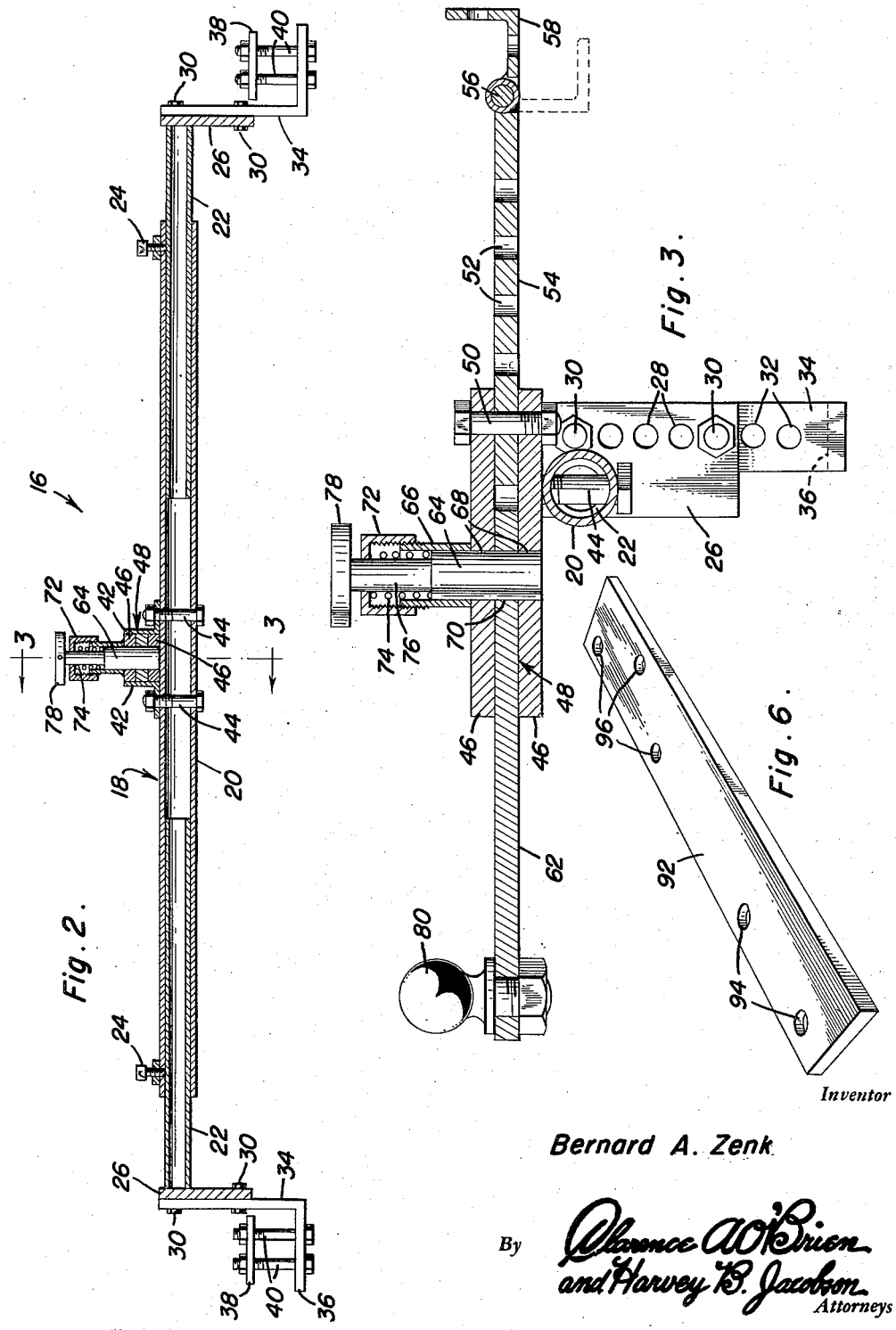

Patented Sept. 25, 1951

2,569,086

UNITED STATES PATENT OFFICE 2,569,086

ADJUSTABLE TRAILER HITCH

Bernard A. Zenk, Truman, Minn.

Application May 20, 1949, Serial No. 94,484

10 Claims. (Cl. 280—33.44)

This invention relates to new and useful improvements and structural refinements in trailer hitches, and the principal object of the invention is to provide a simple, highly durable hitch of an adjustable nature, whereby it is adapted for convenient and expeditious attachment to automobiles, trucks and similar vehicles.

An important feature of the invention resides in its extreme versatility as facilitated by adjustable positioning of its various parts, and another feature of the invention lies in the ease and convenience with which the several parts of the hitch may be replaced in the event of breakage or damage.

Some of the advantages of the invention reside in its simple structural arrangement as aforesaid, and in its consequent adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a top plan view showing a rear portion of a vehicle chassis with the invention in situ thereon;

Figure 2 is a cross-sectional view of the invention per se, this being taken substantially in the plane of the line 2—2 in Figure 1;

Figure 3 is a cross-sectional detail, taken substantially in the plane of the line 3—3 in Figure 2;

Figure 4 is an elevational view of the invention per se, taken in the direction of the arrow 4 in Figure 1;

Figure 5 is a perspective view of a reinforcing member such as may be optionally used in the invention, and Figure 6 is a perspective view of a reinforcing strap which may also be optionally employed.

Like characters of reference are used to designate like parts in the specification and throughout the several views.

Referring now to the accompanying drawings in detail, more particularly to Figures 1-4 thereof, the general reference character 10 designates the frame or chassis of a vehicle, such as an automobile, or the like, the same being provided at the rear end thereof with a set of rearwardly projecting arms 12 carrying the usual bumper 14.

The invention involves the provision of an adjustable trailer hitch designated generally by the reference character 16, this embodying in its construction a shaft-like supporting member 18 which extends transversely between and is secured to the bumper arms 12, as will be presently described. The member 18 consists of a tubular intermediate section 20 and a pair of tubular end sections 22 which are slidably telescoped in the ends of the intermediate section 20, so that the member 18 may be expeditiously adjusted to suit the transverse spacing of the bumper arms 12 on different vehicles. Suitable set screws 24 are provided in the end portions of the section 20 and are frictionally engageable with the sections 22, whereby slidable telescoping of the several sections is prevented after the member 18 is adjusted to a proper, predetermined overall length.

A pair of plates 26 are welded or otherwise secured to the outer ends of the sections 22, these plates being provided with rows of apertures 28 to selectively receive suitable bolts 30 which are also selectively receivable in rows of apertures 32 provided in a pair of L-shaped brackets 34. By virtue of the apertures 28, 32, the brackets 34 may be adjusted vertically relative to the plates 26, it being noted that the brackets 34 have horizontal portions 36 equipped with suitable clamping plates 38 and clamping bolts 40, so that the entire supporting member 18 may be rigidly secured to the bumper arms 12, as aforesaid.

A pair of spaced parallel angles 42 are rigidly secured by suitable bolts 44 to the intermediate section 20 of the member 18, and a pair of vertically spaced straps 46 are secured between the angles 42 by welding, or the like. The elongated space between the straps 46 constitutes what may be referred to as a forwardly and rearwardly extending socket 48, and a vertical bolt 50, positioned in a pair of vertically aligned apertures provided in the straps 46 extends through the forward end portion of the socket 48. This bolt is receivable selectively in a row of apertures 52 provided in a strap-like strap element 54, one end portion of the latter being receivable in the socket 48 while its remaining end portion, that is, its forward end portion is connected by a hinge 56 to a transverse angle 58 which, in turn, may be rigidly secured to a cross-member 60 of the vehicle frame 10. It is to be noted in this connection that the selective positioning of the bolt 50 in the various apertures 52 and the provision of the hinge 56 facilitates attachment of the angle 58 to the frame member 60 regardless of the height and distance of the frame member relative to the point of attachment of the clamps 36, 38 to the bumper arms 12.

A drawbar 62 is removably receivable in the rear portion of the socket 48 and is removably retained therein by means of a vertical keeper pin 64, slidable in a tubular sleeve 66 secured to the upper of the aforementioned strap 46, as is best shown in Figure 3. The pin 64 is slidably receivable in a pair of vertically aligned apertures 68 provided in the straps 46 and is also receivable in an aperture 70 with which the forward end portion of the drawbar 62 is formed.

A screw threaded cap 72 is positioned on the sleeve 66 and accommodates a compression spring 74, the latter, in turn, being disposed on a diametrically reduced portion 76 of the pin 64, whereby the pin is urged into the apertures 68 of the straps 46, so as to lock the drawbar 62 in the socket 48, as will be clearly apparent.

It is to be noted that the upper, diametrically reduced portion 76 of the pin 64 is provided with a head 78 so that the pin may be withdrawn upwardly from the socket 48 to facilitate removal of the drawbar 62. This feature is of particular importance, since the drawbar, when in position in the socket, projects rearwardly beyond the bumper bar 14 and could easily cause injury in instances where a trailer is not connected to the hitch. However, by virtue of its removability from the socket 48, the drawbar need not project rearwardly beyond the bumper when the hitch is not in use, so that the above-mentioned hazard is eliminated.

Needless to say, the rear end portion of the drawbar 62 is provided with a conventional coupling element 80, as will be clearly apparent.

In instances where substantial downward pressure is exerted upon the drawbar 62 by a trailer, a reinforcing member 82 shown in the accompanying Figure 5 may be employed, this being an optional provision for the purpose of minimizing strain on the drawbar.

The reinforcing member 82 simply consists of a pair of spaced parallel straps 84 provided with rows of apertures 86 to selectively receive the aforementioned bolts 44, it being understood that the straps 84 are positionable on the horizontal flanges of the aforementioned angles 42, substantially as shown by the dotted lines in Figure 4.

The straps 84 are rigidly secured together at the rear ends thereof by a horizontally elongated eye piece 88 which provides an opening or slot 90 for the reception of an intermediate portion of the drawbar 62. The eye piece 88, in effect, constitutes a rearward continuation of the aforementioned socket 48 whereby the drawbar is substantially reinforced when the member 82 is used.

As will be apparent from Figure 1, the clamps 36, 38 at the ends of the supporting member 18 are primarily intended to absorb downward pressure and transmit the same to the bumper bar arms 12, while the draft element 54 and the angle 58 are primarily intended to absorb a pulling force in a horizontal direction which, being transmitted to the frame 10 prevents any possibility of the clamps 36, 38 sliding rearwardly on the arms 12.

However, in instances where additional rigidity is required for heavy duty operation, a pair of reinforcing straps may be optionally employed, one of these being illustrated at 92 in Figure 6. These straps may be provided with a set of apertures 94 whereby they may be rigidly secured by the bolts 30 to the brackets 34, while additional apertures 96 in the brackets 92 facilitate securing of the latter to side members of the frame of trucks, or the like, in instances where such side members extend rearwardly above or below the bumper arms 12.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a vehicle frame having a set of rearwardly projecting bumper arms thereon, a trailer hitch comprising a supporting member extending transversely between and secured at the ends thereof to said bumper arms, a drawbar receiving socket mounted intermediate the ends of said member, a draft element extending forwardly from said socket, a mounting plate vertically pivotally attached to said draft element and adapted to be secured to said frame, and a drawbar removably receivable in said socket.

2. The device as defined in claim 1 wherein said supporting member consists of a plurality of adjustably telescoped sections.

3. The device as defined in claim 1 together with means on said socket for detachably retaining said drawbar therein.

4. In an adjustable trailer hitch, the combination of a supporting member consisting of an intermediate section and a pair of side sections adjustably telescoped in the ends of the intermediate section, clamp brackets provided at the outer ends of said side sections for attachment thereof to the rear bumper arms of a vehicle, a forwardly and rearwardly extending socket mounted on said intermediate section, a drawbar removably receivable in the rear portion of said socket, means for retaining said drawbar in the socket, a draft element receivable in the forward portion of said socket, and an angle bracket hinged to said element and adapted to be secured to a vehicle frame.

5. The device as defined in claim 4 together with a reinforcing member attachable to said socket and provided with an opening to supportably receive said drawbar.

6. The device as defined in claim 5 wherein said drawbar is provided with an aperture, said means comprising a spring-pressed keeper pin provided on said socket and receivable in said aperture.

7. The combination of claim 4 wherein said clamp brackets are vertically adjustably attached to said side sections.

8. The combination of claim 7 wherein said side sections are rotatably disposed in said intermediate section.

9. The combination of claim 4 wherein said side sections are rotatably disposed in said intermediate section.

10. An adjustable trailer hitch comprising a supporting member, means vertically adjustably carried by the ends of said supporting member for detachably securing said member to the vehicle bumper arms, a draft bar, means horizontally adjustably attaching one end of said draft bar to said supporting member, a mounting plate vertically pivotally attached to the other end of said draft bar, said plate being adapted to be secured to a vehicle frame, and a drawbar attached to said member.

BERNARD A. ZENK.

REFERENCES CITED

The following references are of record in the file of this patent:

UNITED STATES PATENTS

| Number | Name | Date |
| --- | --- | --- |
| 2,097,006 | Weis | Oct. 26, 1937 |
| 2,408,531 | Riemann et al. | Oct. 1, 1946 |
| 2,485,743 | Koback | Oct. 25, 1949 |